United States Patent
Anscher et al.

[11] Patent Number: 6,038,746
[45] Date of Patent: Mar. 21, 2000

[54] PRE-LOADABLE CORD LOCK

[75] Inventors: Joseph Anscher, Muttontown; Raymond Capiello, Stony Brook, both of N.Y.

[73] Assignee: National Molding Corporation, Farmingdale, N.Y.

[21] Appl. No.: 09/144,875

[22] Filed: Sep. 1, 1998

[51] Int. Cl.[7] .................................................. F16G 11/00
[52] U.S. Cl. ...................................... 24/115 G; 24/136 R
[58] Field of Search .............................. 24/115 G, 136 R, 24/115 R, 115 H, 136 K, 115 M

[56] References Cited

U.S. PATENT DOCUMENTS

| | | |
|---|---|---|
| 5,197,166 | 3/1993 | Meier et al. . |
| 5,361,461 | 11/1994 | Anscher . |
| 5,621,952 | 4/1997 | Frano . |
| 5,649,340 | 7/1997 | Ida . |
| 5,657,513 | 8/1997 | Takahashi . |
| 5,666,699 | 9/1997 | Takahashi . |
| 5,671,505 | 9/1997 | Anscher . |

*Primary Examiner*—James R. Brittain
*Attorney, Agent, or Firm*—Collard & Roe, P.C.

[57] ABSTRACT

A loadable cord lock comprising an outer telescoping member and an inner telescoping member slidable within the outer telescoping member, each telescoping member having an aperture extending therethrough. The inner and outer members are biased against each other so that the apertures are not aligned, to pinch a cord threaded through the apertures. There is at least one leg having an L-shaped free end attached to the inner telescoping member and extending into the interior cavity of the outer telescoping member. There is at least one leg retainer located within the outer telescoping member to lock the inner telescoping member into first and second locking positions. In the first locking position, the apertures on the inner and outer telescoping members are aligned for feeding a cord therethrough, and in the second locking position, the apertures are not aligned to pinch the cord.

15 Claims, 7 Drawing Sheets

PRE-LOADABLE CORD LOCK

BACKGROUND OF THE INVENTION

1. Field of the Invention

This invention relates to a pre-loadable cord lock for use on athletic clothing, outerwear, backpacks and other items. In particular, the invention relates to a cord lock that can be easily pre-loaded by the manufacturer and subsequently easily actuated to grip one or more cords threaded therethrough.

2. The Prior Art

Cord locks are well known for gripping and retaining cords such as elastic cords on outerwear and luggage. These cord locks are typically made from a pair of telescoping members having apertures therethrough. One telescoping member is biased relative to the other so that their respective apertures are not aligned. In order to use the cord lock, it is necessary to load it by squeezing the two telescoping members together so that their respective apertures are aligned. The user must continue to apply pressure to hold the two members together in this aligned state while simultaneously threading the cord through the aperture. Once the cord is threaded, the user may release the pressure that is exerted on the two members. Because the two members are biased so that their apertures are misaligned, they will pinch the cord that has been threaded therethrough so as to retain the cord in a fixed position.

Although this design has proven to be effective in holding and locking a cord, one disadvantage is that the user must continue to exert downward pressure to align the apertures of the two telescoping members while simultaneously threading the cord through the apertures. Because the biasing force necessary to grip the cord is relatively strong, a relatively large amount of finger pressure must be applied to align the apertures. Thus, it can be cumbersome to simultaneously thread the cord through the apertures while maintaining the apertures in an aligned position. This is especially true during assembly of a large number of units.

Another shortcoming of the prior art is that there is a risk that the lock can be inadvertently disengaged by someone squeezing the two telescoping members together, thereby relieving the tension on the cord and allowing it to slip. To overcome this, the biasing means of the prior art cord locks is very strong. However, as described above, loading the cord lock against such strong biasing means can be very cumbersome.

To overcome these drawbacks, a cord lock that can be preloaded at the time of manufacture is disclosed in U.S. Pat. No. 5,671,505 to Anscher. This cord lock has two telescoping members biased against each other by a spring. The internal member has lateral arms that snap into shoulders on the outer member to lock the cord lock into a loaded position. To release the inner member, the shoulders are pressed inward, which releases the arms of the inner member and allows the inner member to extend out of the outer member, thus misaligning the apertures containing the cord.

This device has the advantage that it will not be inadvertently re-loaded after assembly by pressing on the inner member, because the inner member must be pressed below the surface of the outer member in order for the arms to lock into the shoulders.

While this device has numerous advantages, the recessed small head of the inner member can cause difficulty in loading, and lead to increased stress on the assembler's fingers.

SUMMARY OF THE INVENTION

It is therefore an object of the present invention to provide an improved cord lock that is easy to pre-load and actuate.

It is another object of the present invention to provide a cord lock that cannot be inadvertently re-loaded once it is actuated.

It is yet another object of the present invention to provide a cord lock that is simple and inexpensive to manufacture.

These and other objects are accomplished by a loadable cord lock comprising an outer telescoping member and an inner telescoping member slidable within the outer telescoping member, each telescoping member having an aperture extending therethrough. The inner and outer members are biased against each other so that the apertures are not aligned, to pinch a cord threaded through the apertures. There is at least one leg having an L-shaped free end attached to the inner telescoping member and extending into the interior cavity of the outer telescoping member. The L-shaped free end faces toward the center of the cord lock.

There is at least one leg retaining means located within the outer telescoping member to lock the inner telescoping member into first and second locking positions. In the first locking position, the apertures on the inner and outer telescoping members are aligned for feeding a cord therethrough. In the second locking position, the apertures are not aligned to pinch the cord. The biasing means keeps the inner and outer telescoping members in the second locking position when the cord lock is at rest.

The leg retaining means preferably comprises a longitudinally-extending ramp connected at an upper end to the outer telescoping member. The ramp is angled outwardly so as to bias the leg when the inner telescoping member is pressed into the outer telescoping member and the leg slides along the ramp. The ramp has a ledge with an upwardly-extending slot disposed at an intermediate point along the front side of the ramp. The ledge receives the L-shaped portion of the leg when the inner telescoping member is pressed into the outer telescoping member. The slot makes the lower portion of the ramp thinner and thus resilient to accommodate further downward movement of the leg.

There is a flexible lower foot portion extending below the slot on the lower end of the ramp. The lower foot portion has rearwardly-extending lip on its end to prevent the leg from sliding back into the slot once the leg passes around the lower foot portion.

There is a ledge positioned on the rear side of the ramp above the slot to form a stop for the leg as it slides up the rear portion of the ramp. Once the leg is in the ledge in the first locking position, further pressing on the inner telescoping member causes the leg to slide out of the slot and around the lower foot portion and catch on the ledge in the second locking position. There is a shoulder element positioned at the bottom of the side wall of the outer telescoping member that contacts the leg as it slides downward and pushes the leg around the bottom of the ramp. The lower portion of the ramp flexes as the leg is moving and allows the leg to pass around the bottom of the ramp and up the opposite side to reside in the second locking position. The lip on the lower foot portion as well as the shoulder element prevents the leg from being inadvertently pressed back into the first locking position. This is important because an inadvertent return to the first locking position may cause the cord to be released from the apertures.

The cord can still be adjusted once the second locking position is achieved, by manually pressing on the inner telescoping member until the holes are aligned. However, as soon as the pressure is released, the inner telescoping member returns to the biased second locking position.

While the ramp is angled to bias the leg as it slides along the ramp, the leg is in a relaxed, unbiased position while it resides in either of the two locking positions. This is an important feature because long residence time in a biased position could lead to permanent deformation of the leg into the biased position, which would render the cord lock inoperable.

The biasing means is preferably a spring coupled between the inner and outer telescoping members. The spring is compressed when the inner telescoping member is placed into the first locking position, and is released slightly, but not fully, when the inner telescoping member is placed into the second locking position.

In an alternative embodiment, the leg retaining means comprises a longitudinally-extending ramp connected to a side wall of the outer telescoping member and angled toward the front side so as to bias the leg when the inner telescoping member is pressed into the outer telescoping member and the leg slides along the ramp. The ramp has an indentation in an intermediate point of its front side that forms the first locking position for receiving the L-shaped portion of the leg when the inner telescoping member is pressed into said outer telescoping member. In this first locking position, the leg is kept in a biased state while in the indentation.

There is a flexible lower foot portion extending below the indentation and an upwardly-extending slot positioned near the rear side of the ramp above the indentation. Further pressing on the inner telescoping member causes the leg to slide out of the indentation and around the lower foot portion and into the slot to form the second locking position. The lower portion of the ramp flexes to accommodate the movements of the leg. A shoulder element is positioned at the bottom of the side wall of the outer telescoping member. The shoulder element has a sloped surface that forces the leg inward and around the bottom of the ramp and into the second locking position. In this embodiment, the leg cannot return to the first locking position, because the leg must be biased outward to fit into the indentation. This way, once the second locking position is achieved, the cord can never be inadvertently lost due to locking of the cord lock in an "open" position.

In another alternative embodiment, the L-shaped free end of the leg faces toward the exterior of the cord lock. The leg retaining means comprises a longitudinally-extending ramp connected at an upper end to the outer telescoping member and is angled toward the front side so as to bias the leg when the inner telescoping member is pressed into the outer telescoping member and the leg slides along the ramp. The ramp has an indentation forming the first locking position disposed at an intermediate point along the front side of the ramp for receiving the L-shaped portion of the leg when the inner telescoping member is pressed into the outer telescoping member. In the first locking position, the leg remains in a biased state.

There is a lower foot portion extending below the indentation and a ledge positioned near the rear side of the ramp above the indentation. Further pressing on the inner telescoping member causes the leg to slide out of the indentation and around the lower foot portion and up to the ledge to form the second locking position. During this motion, the lower portion of the ramp flexes to accommodate the movements of the leg. There is also a shoulder element positioned at the bottom of the side wall of the outer telescoping member, that has a sloped surface to push the leg around the bottom of the ramp. As with the second embodiment, the leg cannot return to the first locking position because it is no longer in a biased state once it slides past the lower foot portion and into the second locking position.

The cord lock can be made of any suitable material, such as acetyl or nylon. Other materials could also be envisioned.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
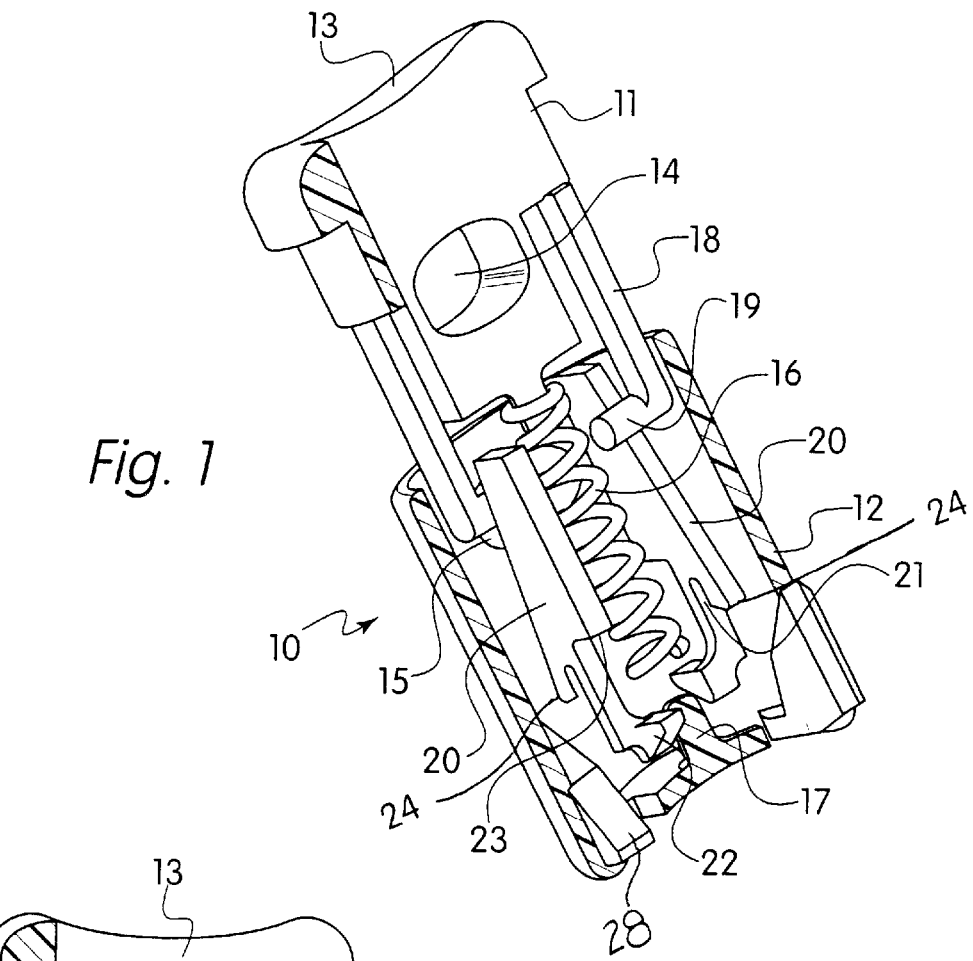
FIG. 1 shows a perspective view in partial cross-section of the cord lock according to the invention in an installation position.
Figure 2:
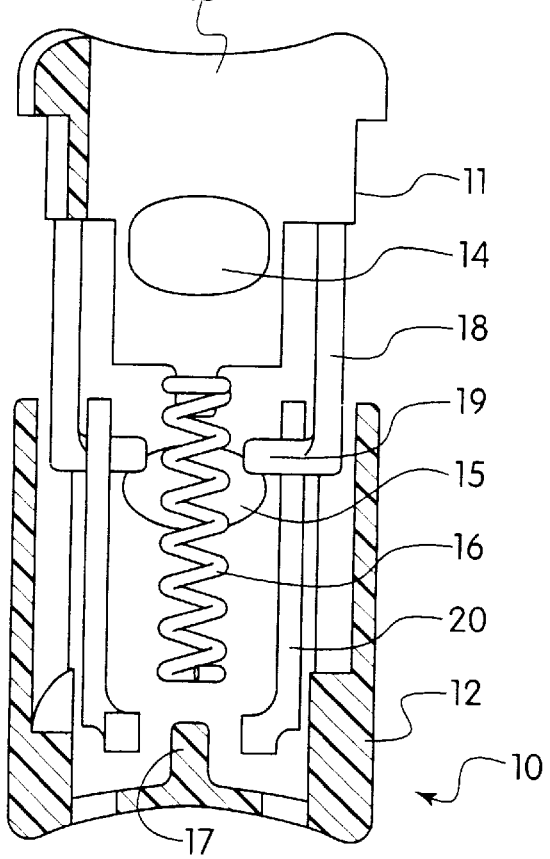
FIG. 2 shows a partial cross-sectional view from the front of the embodiment in FIG. 1.
Figure 3:
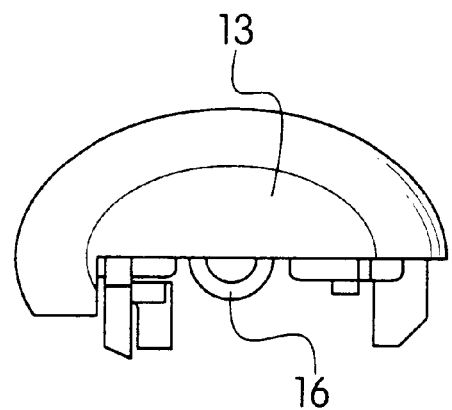
FIG. 3 shows a partial cross-sectional view from the top of the embodiment shown in FIG. 1.
Figure 4:
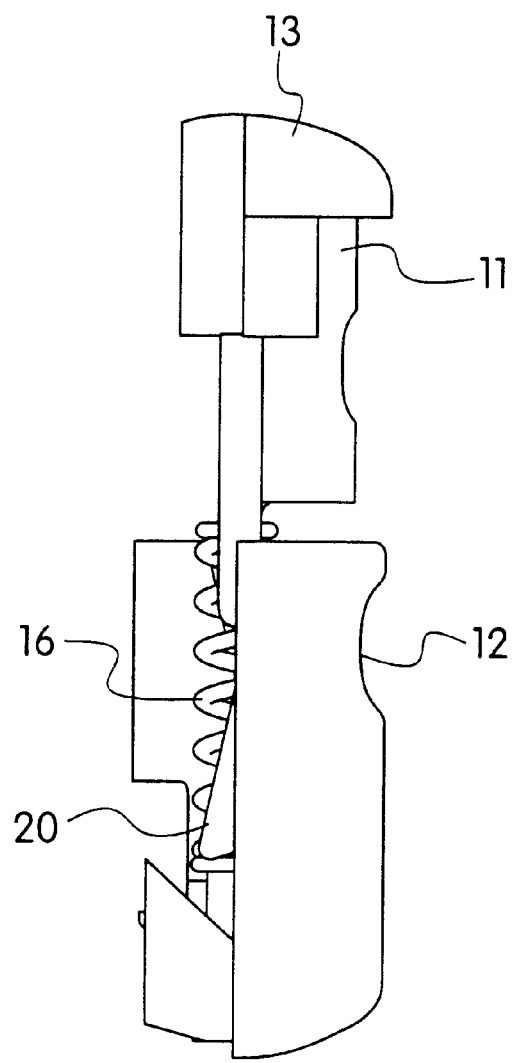
FIG. 4 shows a partial cross-sectional view from the side of the embodiment shown in FIG. 1.

Referring now in detail to the drawings and, in particular, FIGS. 1–4, there is shown a preferred embodiment of the cord lock 10 according to the invention. Cord lock 10 comprises an inner telescoping member 11 and an outer telescoping member 12. Inner telescoping member 11 has a top push surface 13, an aperture 14, and two legs 18 that extend down into outer telescoping member 12. Legs 18 have inwardly-facing L-shaped free ends 19. A spring 16 is connected to inner telescoping member 11 and extends down toward bottom 17 of outer telescoping member 12. When inner telescoping member 11 is pushed into outer telescoping member 12, spring 16 is compressed against bottom 17 of outer telescoping member 12 and biases the two telescoping members against each other.

Outer telescoping member 12 has an aperture 15 that corresponds to aperture 14 of inner telescoping member 11. When inner telescoping member 11 is pressed into outer telescoping member 12 to a certain degree, apertures 14 and 15 become aligned and a cord is able to be threaded through.

Figure 5:
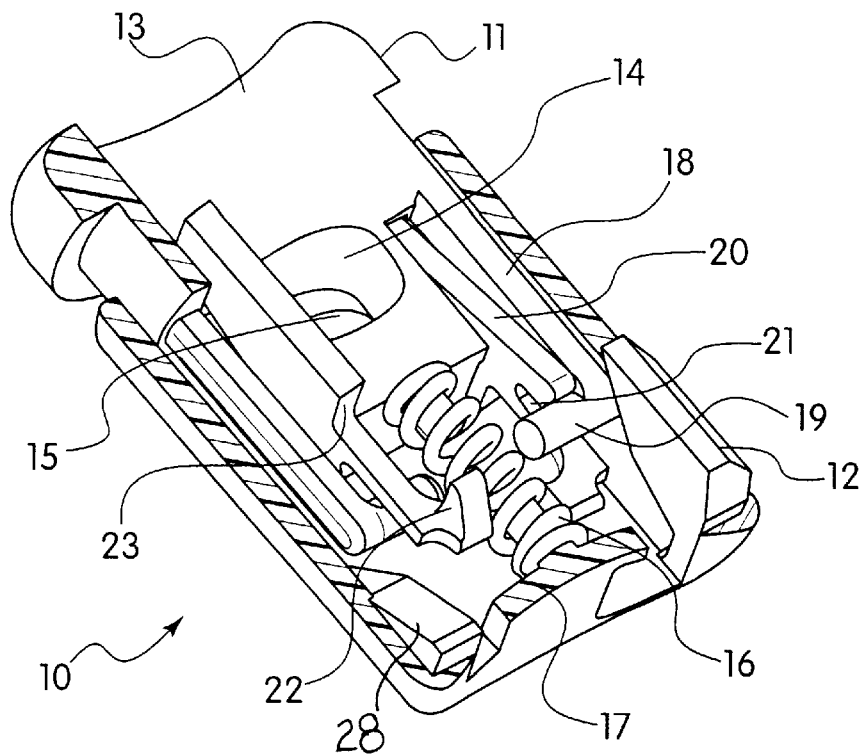
FIG. 5 shows a perspective view in partial cross-section of the embodiment shown in FIG. 1 in the first locking position.
Figure 6:
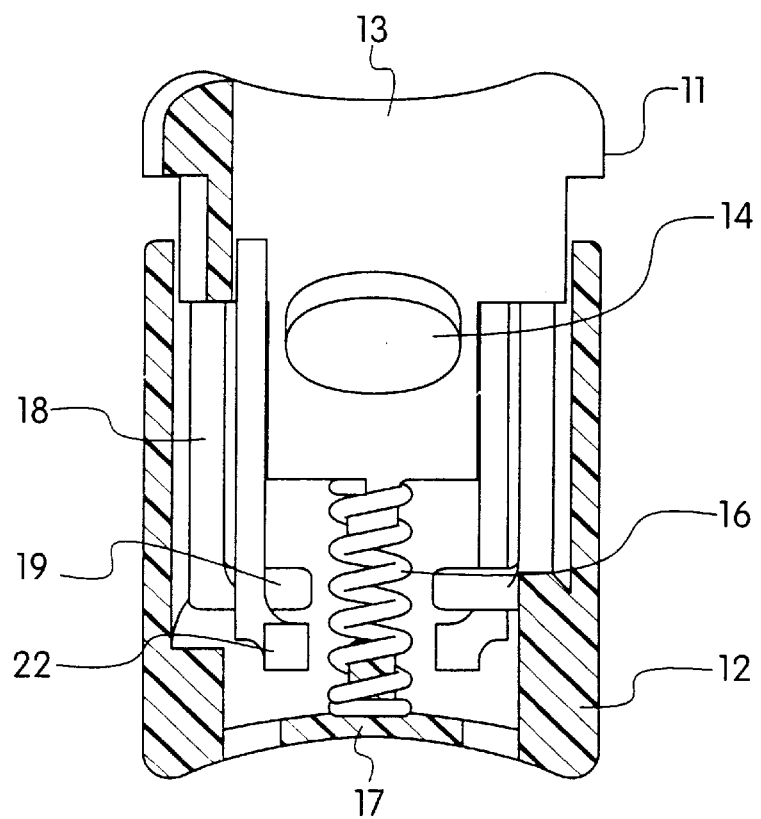
FIG. 6 shows a partial-cross sectional view from the front of the embodiment shown in FIG. 5.

Outer telescoping member 12 is equipped with two leg retaining means that are able to lock legs 18 into two different positions. The leg retaining means is a slanted ramp 20 that biases leg 18 as it slides down ramp 20 as inner telescoping member 11 is pressed into outer telescoping member 12. Ramp 20 has a ledge 24 with an upwardly-extending slot 21. Ledge 24 receives L-shaped free end 19 of leg 18 after it slides along ramp 20, as shown in FIGS. 5 and 6. Slot 21 makes the lower portion of ramp 20 more flexible and allows it to bend as leg 18 moves downward. As free end 19 becomes trapped against ledge 24, apertures 14 and 15 become aligned. At this point, the cord lock is "loaded" and ready to receive a cord through apertures 14 and 15.

Figure 7:
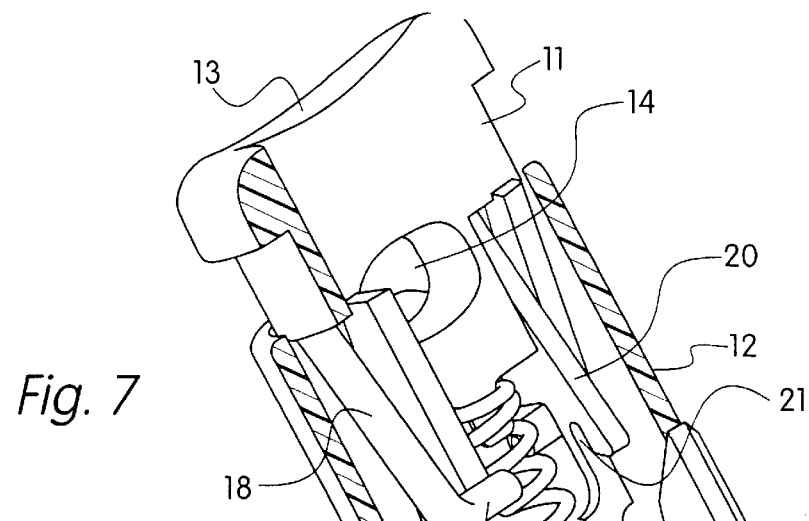
FIG. 7 shows a perspective view in partial cross-section of the embodiment shown in FIG. 1 in the second locking position.
Figure 8:
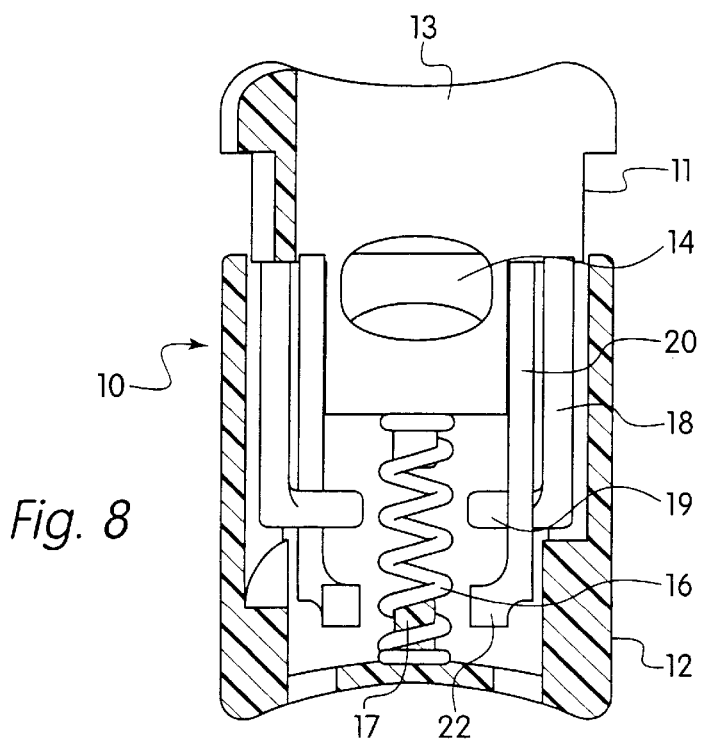
FIG. 8 shows a partial cross-sectional view from the front of the embodiment shown in FIG. 7.

Ramp 20 also has a flexible lower foot portion having a rearwardly-projecting lip 22, and a ledge 23 located on the rear side of ramp 20 above ledge 24. After the cord lock is loaded, further downward pressure on inner telescoping member 11 causes leg 18 to slide down around lip 22 and up to ledge 23, where further upward movement is prevented by ledge 23, as shown in FIGS. 7 and 8. Shoulder elements 28 are disposed underneath legs 18 and are attached to outer telescoping member 12. Shoulder elements 28 have a sloped surface that contacts foot 19 and pushes it inward and around the lower portion of ramp 20 and up the opposite side. At this point, apertures 14 and 15 are not aligned and can securely grip the cord threaded therethrough. Ramps 20 are arranged so that they face in opposite directions. Shoulder elements 28 are also arranged in opposite directions to accommodate the movement of legs 18. This arrangement causes legs 18 to be biased in opposite directions to properly balance the cord lock.

While legs 18 are disposed in either ledge 24 or up against ledge 23, legs 18 are not biased and are in a straight, relaxed position. This is important because long periods of time in a biased position, especially under extreme heat, can cause legs 18 to become permanently biased and render cord lock 10 inoperable.

Lip 22 on ramp 20 ensures that once leg 18 passes around the lower foot portion of ramp 20, it cannot return to slot 21 to be in the loading position. This is a safety measure, because inadvertent re-loading of cord lock 10 can cause any cord threaded through the apertures to be lost. The cord can still be adjusted by pressing downward on inner telescoping member 11 until the apertures are aligned. However, the cord lock will not remain in this position and will spring back to the position shown in FIGS. 5 and 6 when the pressure is released.

Figure 9:
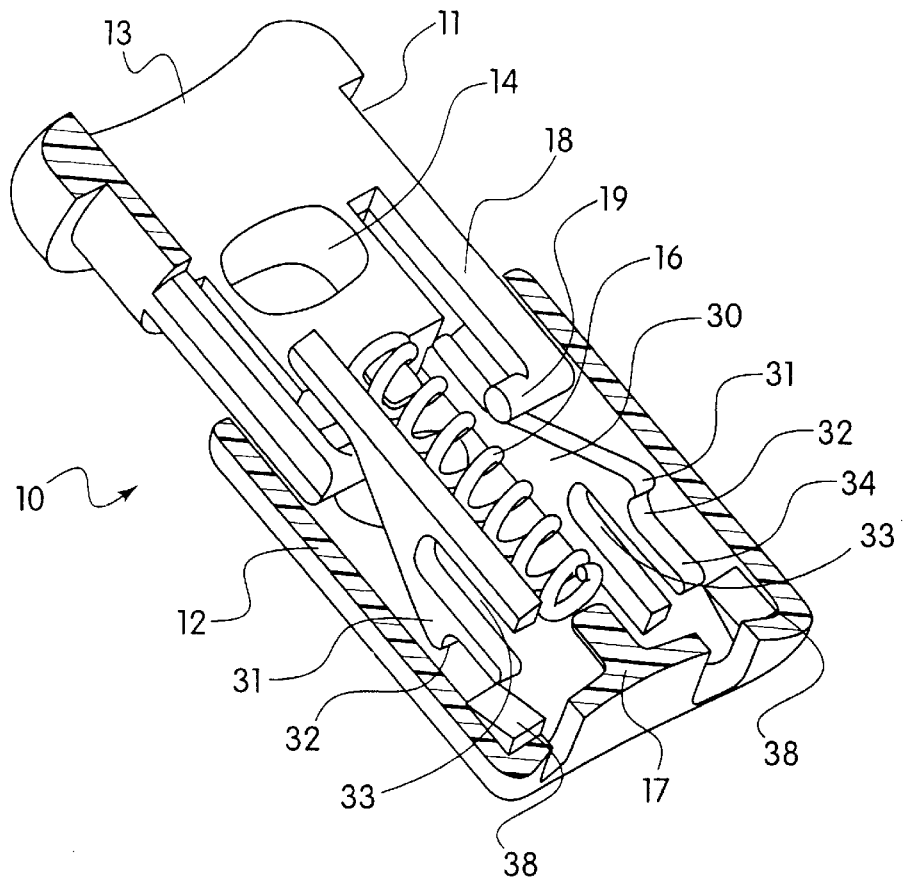
FIG. 9 shows a perspective view in partial cross-section of an alternative embodiment of the cord lock according to the invention.
Figure 10:
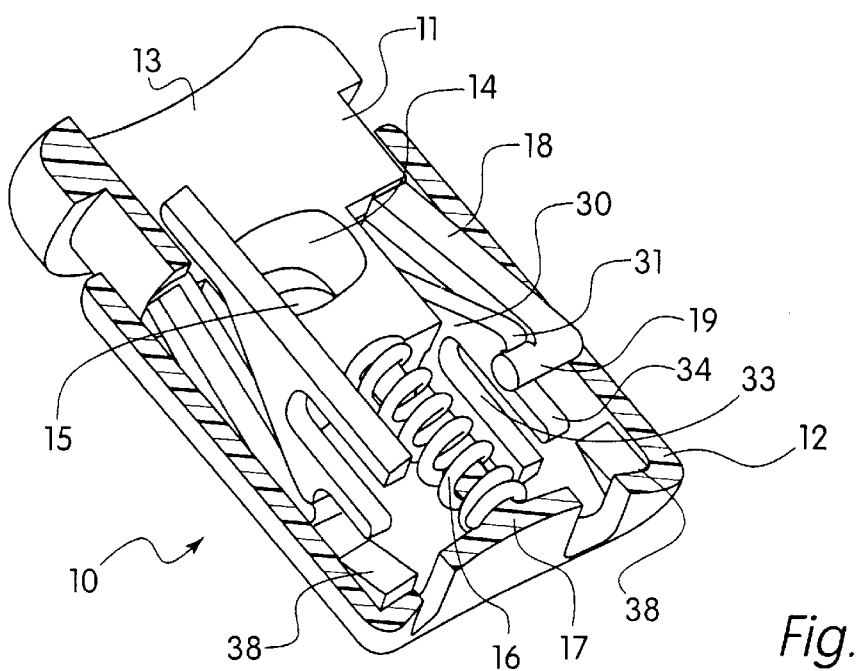
FIG. 10 shows a perspective view in partial cross-section of the embodiment of FIG. 9 in the first locking position.
Figure 11:
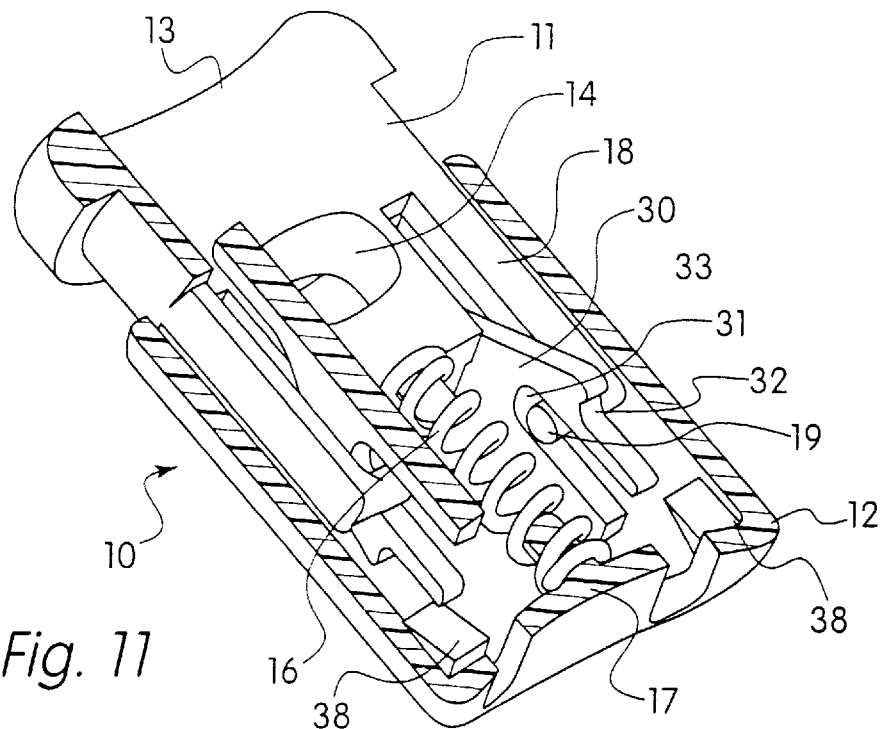
FIG. 11 shows a perspective view in partial cross-section of the embodiment of FIG. 9 in the second locking position.

An alternative embodiment of cord lock 10 is shown in FIGS. 9–11. In this embodiment, the leg retaining means comprises a ramp 30 that is slanted to bias leg 18 as it slides down ramp 30. There is an indentation 31 at an intermediate point of ramp 30 into which leg 18 rests upon pressing inner telescoping member 11 into outer telescoping member 12. At this point, leg 18 is still in a biased state and cord lock 10 is loaded to receive a cord through apertures 14 and 15, as shown in FIG. 10. Further pressure on inner telescoping member 11 causes leg 18 to slide out of indentation 31, down and around flexible lower portion 34 and up into a slot 33, with the help of shoulder elements 38. The lower portion 34 flexes to accommodate this movement of leg 18. At this point, leg 18 is not biased and is in a straight, relaxed state.

Once leg 18 is in slot 33, the apertures are not aligned any more and can pinch a cord threaded therethrough. Leg 18 cannot be inadvertently placed back into indentation 18 to lock it into a loaded state because it is impossible to bias leg 18 in such a way to force it back into indentation 18. This way, inadvertent loading of cord lock 10 is avoided.

Figure 12:
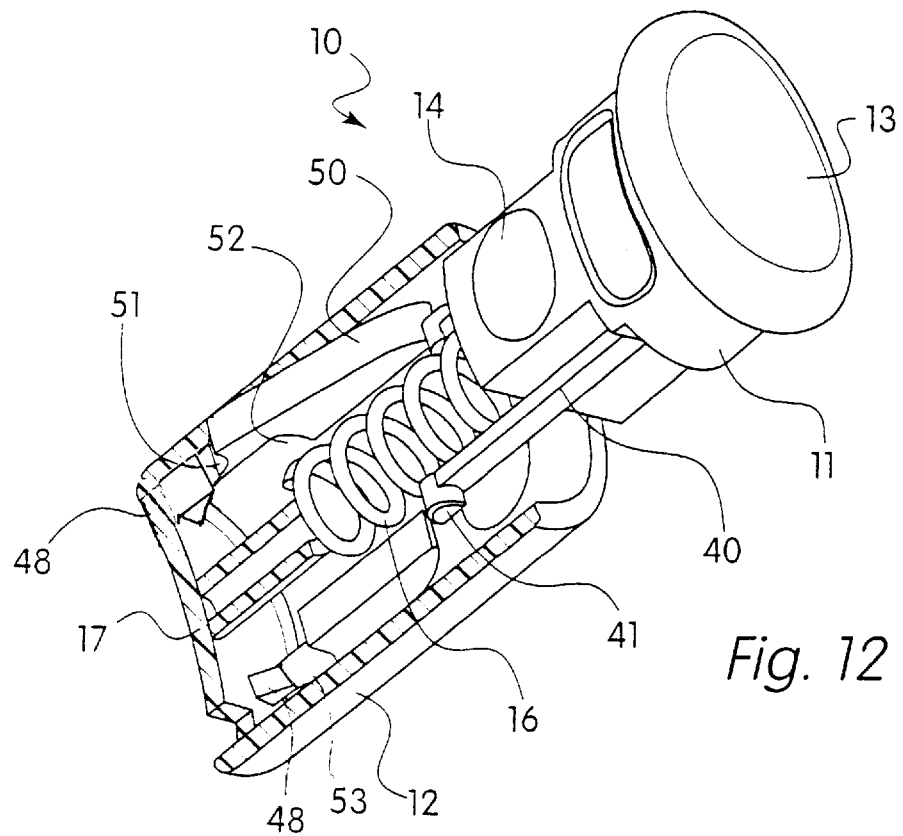
FIG. 12 shows a perspective view in partial cross-section of another alternative embodiment of the cord lock according to the invention.
Figure 13:
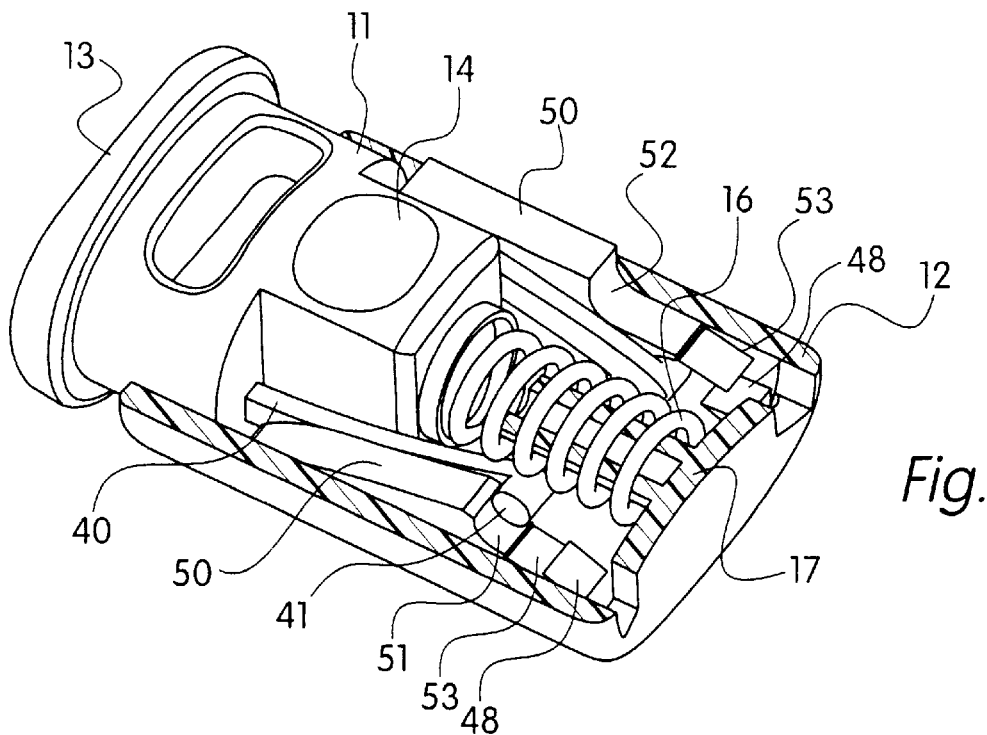
FIG. 13 shows a perspective view in partial cross-section of the embodiment of FIG. 12 in the first locking position.
Figure 14:
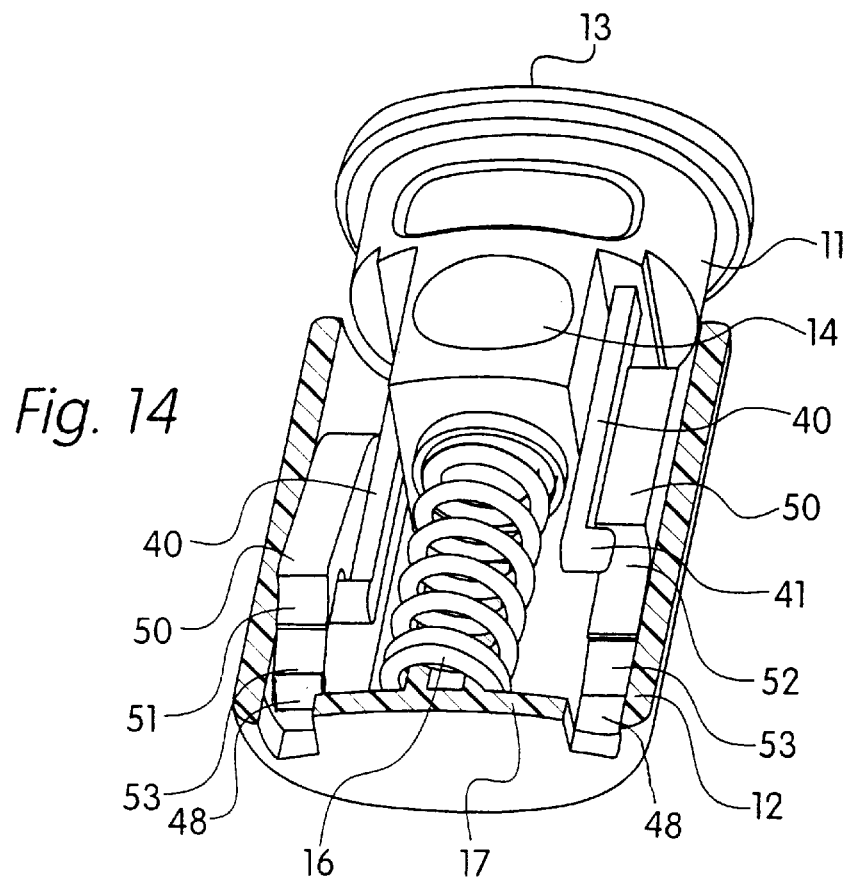
FIG. 14 shows a perspective view in partial cross-section of the embodiment of FIG. 12 in the second locking position.

Another alternative embodiment is shown in FIGS. 12–14. In this embodiment, legs 40 have an L-shaped free end 41 that faces toward the outside of cord lock 10, in contrast to the other two embodiments described above, in which the L-shaped free ends faced inward.

In this embodiment, the cord-retaining means comprises an angled ramp 50 having an indentation 51 into which leg 40 slides to load cord lock 10, as shown in FIG. 13. Leg 40 is in a biased state as it slides along ramp 50 and also while it resides in indentation 51. Further downward pressure on inner telescoping member 11 causes leg 40 to slide down out of indentation 40, around lower portion 53 ramp 50 and up the rear side of ramp 50 until it encounters a ledge 52, which prevents further upward movement of leg 40. This movement is facilitated by shoulder elements 48. Lower portion 53 flexes to accommodate this movement of leg 40. At this point, shown in FIG. 14, the apertures are not aligned and a cord can be firmly held by cord lock 10. Also at this point, leg 40 is no longer biased and remains in a relaxed, straight position. Leg 40 cannot return to the loading position in indentation 51 because it is no longer biased or bent outward enough to fit into indentation 51. The apertures can still be aligned by pressing downward on inner telescoping member 11, however the cord lock will immediately return to a non-aligned state once the pressure on inner telescoping member is released.

Accordingly, while only a few embodiments of the present invention have been shown and described, it is obvious that many changes and modifications may be made thereunto without departing the spirit and scope of the invention.

What is claimed is:

1. A loadable cord lock comprising:
   an outer telescoping member having at least two side walls defining an interior cavity, and an aperture extending through said two side walls;
   an inner telescoping member slidable within the cavity of said outer telescoping member and having an aperture extending therethrough;
   means for biasing said inner and outer members so that said apertures are not aligned, to pinch a cord threaded through said apertures;
   at least one leg attached to the inner telescoping member and extending into the interior cavity of the outer telescoping member, said leg having an L-shaped free end; and
   a longitudinally-extending ramp connected at an upper end to the outer telescoping member and disposed within the cavity of the outer telescoping member, said ramp having a front side and a rear side and being angled toward the front side so as to bias the leg when said inner telescoping member is pressed into said outer telescoping member and said leg slides along the ramp, said ramp further comprising:

a first ledge forming a first locking position disposed at an intermediate point along the front side of the ramp for receiving the L-shaped portion of the leg when said inner telescoping member is pressed into said outer telescoping member;

a flexible lower foot portion extending below the slot; and a second ledge positioned on the rear side of the ramp above the slot, wherein further pressing on the inner telescoping member causes the leg to slide out of the first ledge and around the lower foot portion and catch on the second ledge in a second locking position;

such that in the first locking position, the apertures on the inner and outer telescoping members are aligned for feeding a cord therethrough, and in the second locking position, the apertures are not aligned to pinch the cord.

2. The cord lock according to claim 1, wherein the L-shaped free end of the leg extends toward an inner portion of the cord lock.

3. The cord lock according to claim 1, wherein the leg is not biased when it resides in the slot or under the ledge.

4. The cord lock according to claim 1, wherein the biasing means comprises a spring coupled between the inner and outer telescoping members, said spring being compressed when said inner telescoping member is positioned into the first locking position.

5. The cord lock according to claim 1, further comprising means for preventing the inner telescoping member from returning to the first locking position once the second locking position has been attained.

6. The cord lock according to claim 1, wherein the inner telescoping member has a top surface that extends beyond the circumference of the outer telescoping member.

7. The cord lock according to claim 1, further comprising at least one shoulder element disposed at a lower section of a side wall of the outer telescoping member, said shoulder element having a sloped surface directed toward the rear side of the ramp, said shoulder element contacting the L-shaped free end of the leg as it slides down the ramp, and pushing said foot toward the rear side of the ramp while bending the lower foot portion of the ramp.

8. A loadable cord lock comprising:

an outer telescoping member having at least two side walls defining an interior cavity, and an aperture extending through said two side walls;

an inner telescoping member slidable within the cavity of said outer telescoping member and having an aperture extending therethrough;

means for biasing said inner and outer members so that said apertures are not aligned, to pinch a cord threaded through said apertures;

at least one leg attached to the inner telescoping member and extending into the interior cavity of the outer telescoping member, said leg having an L-shaped free end; and a longitudinally-extending ramp located within the cavity of the outer telescoping member and connected to a side wall of the outer telescoping member, said ramp having a front side and a rear side and being angled toward the front side so as to bias the leg when said inner telescoping member is pressed into said outer telescoping member and said leg slides along the ramp, said ramp further comprising:

an indentation forming a first locking position disposed at an intermediate point along the front side of the ramp for receiving the L-shaped portion of the leg when said inner telescoping member is pressed into said outer telescoping member;

a flexible lower foot portion extending below the slot; and an upwardly-extending slot positioned near the rear side of the ramp above the indentation, wherein further pressing on the inner telescoping member causes the leg to slide out of the indentation and around the lower foot portion and into the slot to form a second locking position;

such that in the first locking position, the apertures on the inner and outer telescoping members are aligned for feeding a cord therethrough, and in the second locking position, the apertures are not aligned to pinch the cord.

9. The cord lock according to claim 8, wherein the L-shaped free end of the leg extends toward an inner portion of the cord lock.

10. The cord lock according to claim 8, wherein the leg is biased when it resides in the indentation.

11. The cord lock according to claim 8, further comprising at least one shoulder element disposed at a lower section of a side wall of the outer telescoping member, said shoulder element having a sloped surface directed toward the rear side of the ramp, said shoulder element contacting the L-shaped free end of the leg as it slides down the ramp, and pushing said foot toward the rear side of the ramp while bending the flexible lower foot portion of the ramp.

12. A loadable cord lock comprising:

an outer telescoping member having at least two side walls defining an interior cavity, and an aperture extending through said two side walls;

an inner telescoping member slidable within the cavity of said outer telescoping member and having an aperture extending therethrough;

means for biasing said inner and outer members so that said apertures are not aligned, to pinch a cord threaded through said apertures;

at least one leg attached to the inner telescoping member and extending into the interior cavity of the outer telescoping member, said leg having an L-shaped free end; and a longitudinally-extending ramp disposed within the cavity of the outer telescoping member and connected at an upper end to the outer telescoping member, said ramp having a front side and a rear side and being angled toward the front side so as to bias the leg when said inner telescoping member is pressed into said outer telescoping member and said leg slides along the ramp, said ramp further comprising:

an indentation forming a first locking position disposed at an intermediate point along the front side of the ramp for receiving the L-shaped portion of the leg when said inner telescoping member is pressed into said outer telescoping member;

a flexible lower foot portion extending below the indentation; and a ledge positioned on the rear side of the ramp above the indentation, wherein further pressing on the inner telescoping member causes the leg to slide out of the indentation and around the lower foot portion and up to the ledge to form a second locking position;

such that in the first locking position, the apertures on the inner and outer telescoping members are aligned for feeding a cord therethrough, and in the second locking position, the apertures are not aligned to pinch the cord.

13. The cord lock according to claim 12, wherein the L-shaped free end extends toward the exterior of the cord lock.

14. The cord lock according to claim 12, wherein the leg is biased as it resides in the indentation.

15. The cord lock according to claim 12, further comprising at least one shoulder element disposed at a lower section of a side wall of the outer telescoping member, said shoulder element having a sloped surface directed toward the rear side of the ramp, said shoulder element contacting the L-shaped free end of the leg as it slides down the ramp, and pushing said foot toward the rear side of the ramp while bending the flexible lower foot portion of the ramp.

* * * * *

UNITED STATES PATENT AND TRADEMARK OFFICE
CERTIFICATE OF CORRECTION

PATENT NO. : 6,038,746
DATED : March 21, 2000
INVENTOR(S) : ANSCHER ET AL

It is certified that error appears in the above-identified patent and that said Letters Patent is hereby corrected as shown below:

On the title page, Item [75], change the name of the second inventor to read:

--Cappiello--.

Signed and Sealed this

Twentieth Day of February, 2001

Attest:

NICHOLAS P. GODICI

*Attesting Officer*   *Acting Director of the United States Patent and Trademark Office*